(12) United States Patent
Robinson

(10) Patent No.: US 7,266,196 B1
(45) Date of Patent: Sep. 4, 2007

(54) TELEPHONE MOUTHPIECE AND EARPIECE COVER SYSTEM

(76) Inventor: Dave Robinson, 3205 E. Flamingo Rd. #108, Las Vegas, NV (US) 89121

( * ) Notice: Subject to any disclaimer, the term of this patent is extended or adjusted under 35 U.S.C. 154(b) by 0 days.

(21) Appl. No.: 09/593,546

(22) Filed: Jun. 14, 2000

Related U.S. Application Data

(63) Continuation-in-part of application No. 09/048,667, filed on Mar. 26, 1998, now abandoned.

(51) Int. Cl.
*H04M 1/00* (2006.01)
*H04M 9/00* (2006.01)
*B08B 3/00* (2006.01)

(52) U.S. Cl. .................. 379/452; 379/437; 134/137
(58) Field of Classification Search .............. 379/452, 379/439; 134/137
See application file for complete search history.

(56) References Cited

U.S. PATENT DOCUMENTS

| | | | |
|---|---|---|---|
| 2,593,382 A | | 4/1952 | Zimmerman |
| 2,595,517 A | * | 5/1952 | Finlayson et al. .......... 379/452 |
| 3,169,171 A | | 2/1965 | Wachs et al. |
| 3,530,261 A | * | 9/1970 | Guim .................. 379/452 |
| 3,856,571 A | * | 12/1974 | Sherman ............... 134/137 |
| 4,570,038 A | | 2/1986 | Tinelli |
| 4,852,163 A | | 7/1989 | Caceres |
| 5,054,063 A | | 10/1991 | Lo et al. |
| 5,136,639 A | | 8/1992 | Brito |
| 5,501,329 A | | 3/1996 | Provence |
| 6,314,185 B1 | * | 11/2001 | Lashley .................. 379/452 |

FOREIGN PATENT DOCUMENTS

| | | |
|---|---|---|
| WO | 93/06697 | 4/1993 |
| WO | 95/05723 | 2/1995 |

* cited by examiner

*Primary Examiner*—Ahmad F. Matar
*Assistant Examiner*—Aamir Haq
(74) *Attorney, Agent, or Firm*—Rob Phillips; Greenberg Traurig

(57) ABSTRACT

A telephone mouthpiece and earpiece cover system for helping protect a user from contact from germs on a telephone. The system includes an earpiece cover attachment and a mouthpiece cover attachment. The earpiece cover attachment comprises a base having a plurality of holes extending therethrough. The front surface of the base of the earpiece attachment has an annular lip extending around the outer perimeter of the base of the earpiece cover attachment. The back surface of the base of the earpiece cover attachment has a perimeter wall defining a space adapted for inserting the earpiece of a telephone therein. The mouthpiece cover attachment comprises a top with a plurality of apertures extending therethrough. The back surface of the top of the mouthpiece cover attachment has an annular wall, which defines a space adapted for inserting a mouthpiece of a telephone therein.

11 Claims, 4 Drawing Sheets

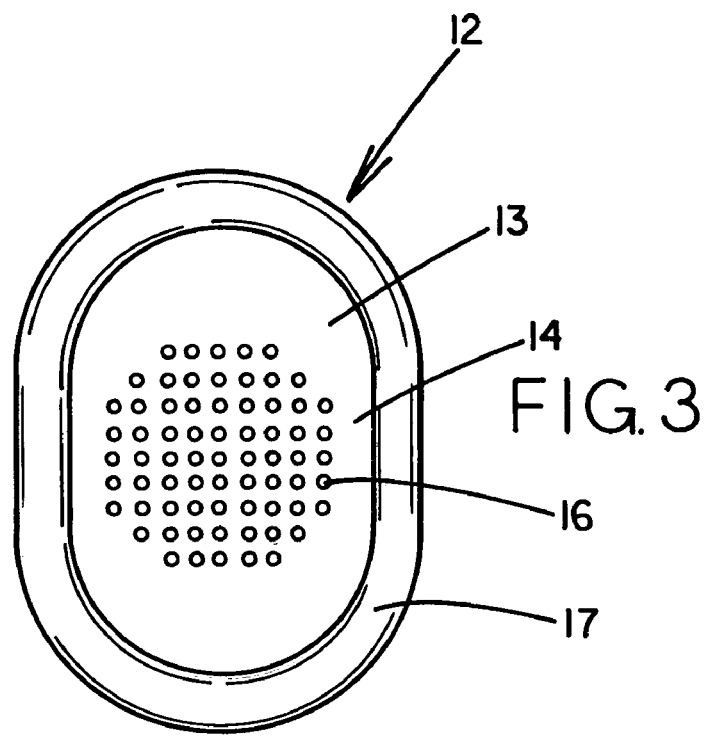
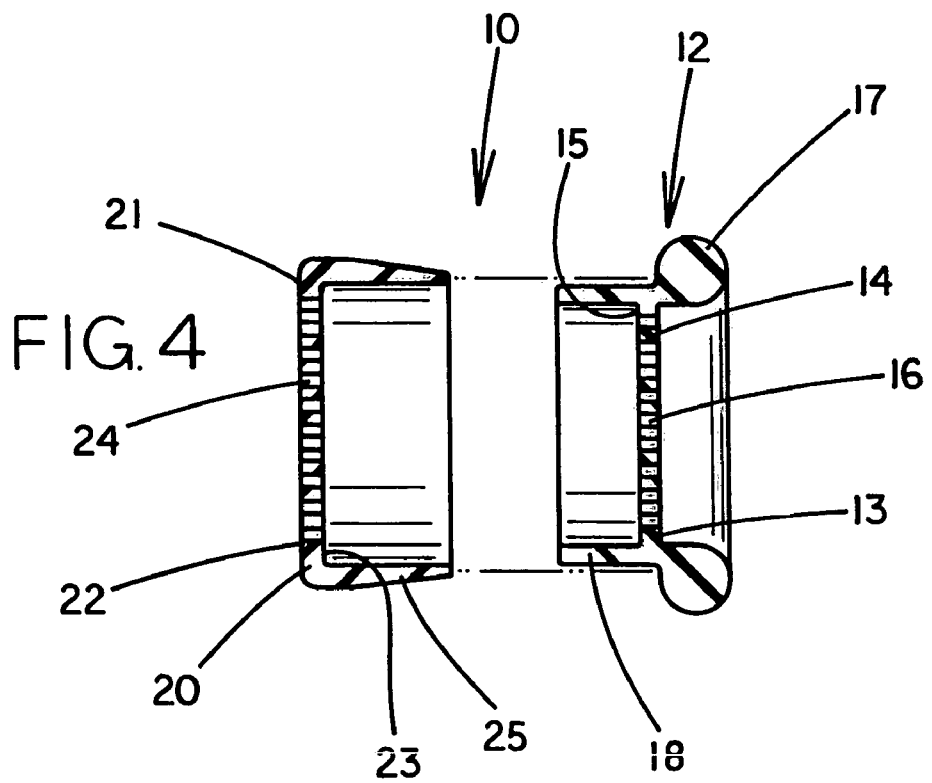

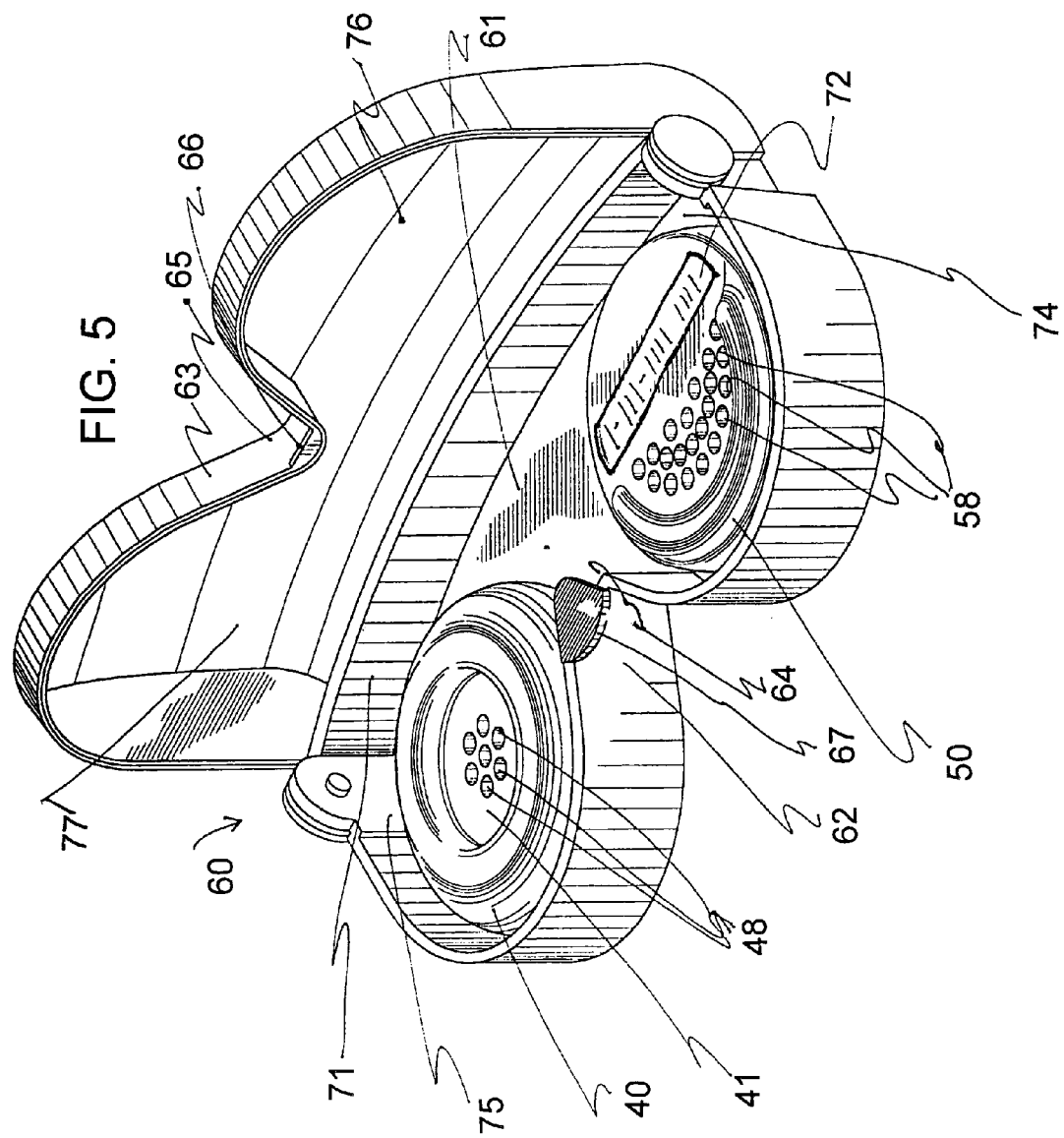

FIG. 6
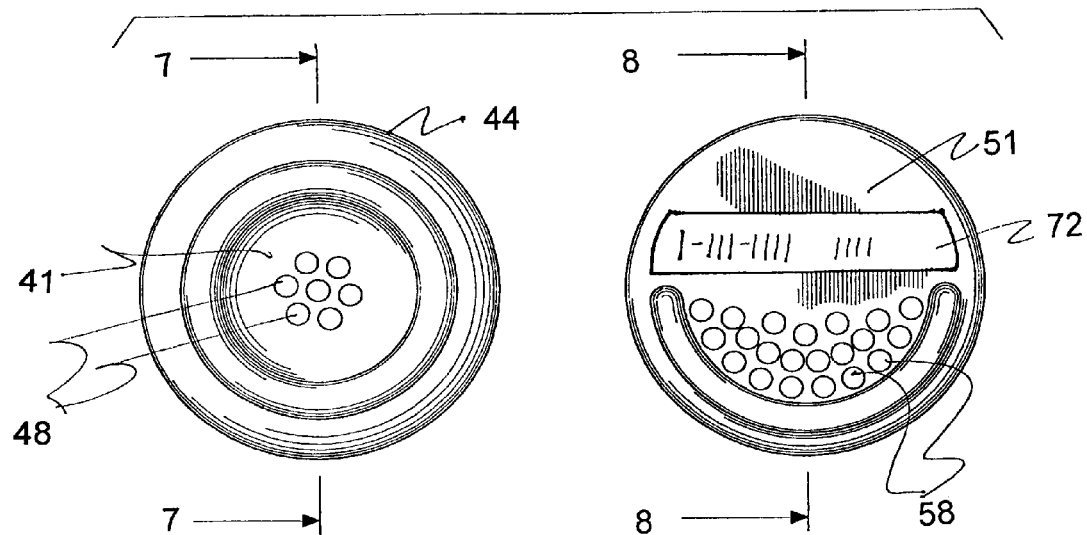
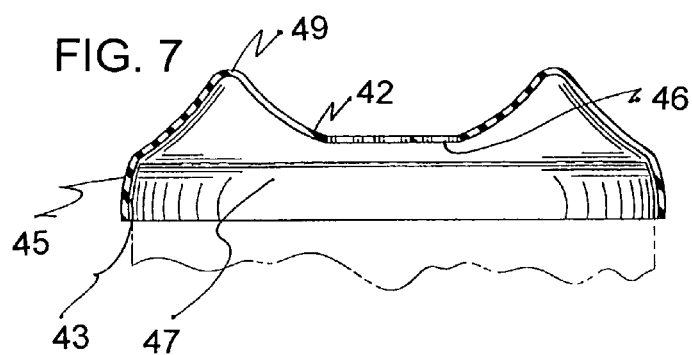
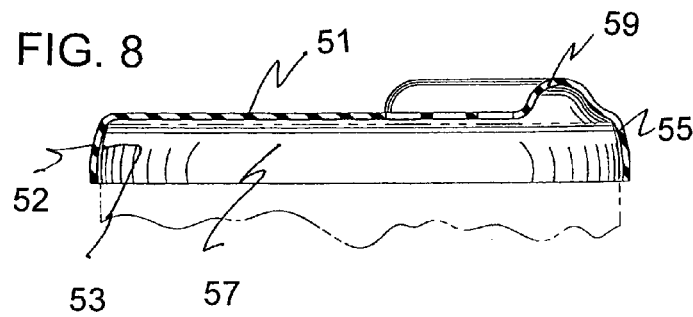

TELEPHONE MOUTHPIECE AND EARPIECE COVER SYSTEM

CROSS REFERENCE TO RELATED APPLICATION

This application is a continuation-in-part of application Ser. No. 09/048,667, filed Mar. 26, 1998, now abandoned.

BACKGROUND OF THE INVENTION

1. Field of the Invention

The present invention relates to telephone accessories and more particularly pertains to a new telephone mouthpiece and earpiece cover system for helping protect a user from contact from germs on a telephone.

2. Description of the Prior Art

The use of telephone accessories is known in the prior art. More specifically, telephone accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art telephone accessories include U.S. Pat. No. 4,852,163; U.S. Pat. No. 3,169,171; PCT Patent No. WO 95/05723; U.S. Pat. No. 5,136,639; U.S. Pat. No. 5,054,063; PCT Patent No. WO 93/06697; and U.S. Pat. No. 2,593,382.

While these devices fulfill their respective, particular objectives and requirements, the aforementioned patents do not disclose a new telephone mouthpiece and earpiece cover system. The inventive device includes an earpiece cover attachment and a mouthpiece cover attachment. The earpiece cover attachment comprises a base having a plurality of holes extending therethrough. The front surface of the base of the earpiece attachment has an annular lip extending around the outer perimeter of the base of the earpiece cover attachment. The back surface of the base of the earpiece cover attachment has a perimeter wall defining a space adapted for inserting the earpiece of a telephone therein. The mouthpiece cover attachment comprises a top with a plurality of apertures extending therethrough. The back surface of the top of the mouthpiece cover attachment has an annular wall which defines a space adapted for inserting a mouthpiece of a telephone therein.

In these respects, the telephone mouthpiece and earpiece cover system according to the present invention substantially departs from the conventional concepts and designs of the prior art, and in so doing provides an apparatus primarily developed for the purpose of helping protect a user from contact from germs on a telephone.

SUMMARY OF THE INVENTION

In view of the foregoing disadvantages inherent in the known types of telephone accessories now present in the prior art the present invention provides a new telephone mouthpiece and earpiece cover system construction wherein the same can be utilized for helping protect a user from contact from germs on a telephone.

The general purpose of the present invention, which will be described subsequently in greater detail, is to provide a new telephone mouthpiece and earpiece cover system apparatus and method which has many of the advantages of the telephone accessories mentioned heretofore and many novel features that result in a new telephone mouthpiece and earpiece cover system which is not anticipated, rendered obvious, suggested, or even implied by any of the prior art telephone accessories, either alone or in any combination thereof.

To attain this, the present invention generally comprises an earpiece cover attachment and a mouthpiece cover attachment. The earpiece cover attachment comprises a base having a plurality of holes extending therethrough. The front surface of the base of the earpiece attachment has an annular lip extending around the outer perimeter of the base of the earpiece cover attachment. The back surface of the base of the earpiece cover attachment has a perimeter wall defining a space adapted for inserting the earpiece of a telephone therein. The mouthpiece cover attachment comprises a top with a plurality of apertures extending therethrough. The back surface of the top of the mouthpiece cover attachment has an annular wall, which defines a space adapted for inserting a mouthpiece of a telephone therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone mouthpiece and earpiece cover system apparatus and method which has many of the advantages of the telephone accessories mentioned heretofore and many novel features that result in a new telephone mouthpiece and earpiece cover system which is not anticipated, rendered obvious, suggested, or even implied by any of the prior art telephone accessories, either alone or in any combination thereof.

It is another object of the present invention to provide a new telephone mouthpiece and earpiece cover system which may be easily and efficiently manufactured and marketed.

It is a further object of the present invention to provide a new telephone mouthpiece and earpiece cover system which is of a durable and reliable construction.

An even further object of the present invention is to provide a new telephone mouthpiece and earpiece cover system which is susceptible of a low cost of manufacture with regard to both materials and labor, and which accordingly is then susceptible of low prices of sale to the consuming public, thereby making such telephone mouthpiece and earpiece cover system economically available to the buying public.

Still yet another object of the present invention is to provide a new telephone mouthpiece and earpiece cover system which provides in the apparatuses and methods of the prior art some of the advantages thereof, while simultaneously overcoming some of the disadvantages normally associated therewith.

Still another object of the present invention is to provide a new telephone mouthpiece and earpiece cover system for helping protect a user from contact from germs on a telephone.

Yet another object of the present invention is to provide a new telephone mouthpiece and earpiece cover system which includes an earpiece cover attachment and a mouthpiece cover attachment. The earpiece cover attachment comprises a base having a plurality of holes extending therethrough. The front surface of the base of the earpiece attachment has an annular lip extending around the outer perimeter of the base of the earpiece cover attachment. The back surface of the base of the earpiece cover attachment has a perimeter wall defining a space adapted for inserting the earpiece of a telephone therein. The mouthpiece cover attachment comprises a top with a plurality of apertures extending therethrough. The back surface of the top of the mouthpiece cover attachment has an annular wall, which defines a space adapted for inserting a mouthpiece of a telephone therein.

Still yet another object of the present invention is to provide a new telephone mouthpiece and earpiece cover system that is portable so that it may be used by a user on several phones.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic front side view of the optional oblong embodiment of the earpiece cover attachment of the present invention.

FIG. 4 is a schematic sectional view of the present invention illustrating the insertability of the earpiece cover attachment into the mouthpiece cover attachment.

FIG. 5 is schematic perspective view of an optional embodiment of the present invention.

FIG. 6 is a schematic top view of the earpiece cover attachment and the mouthpiece cover attachment on the optional embodiment.

FIG. 7 is a schematic sectional view taken along line 7-7 of FIG. 6.

FIG. 8 is a schematic sectional view taken along line 8-8 of FIG. 6.

DESCRIPTION OF THE PREFERRED EMBODIMENT

Figure 1:
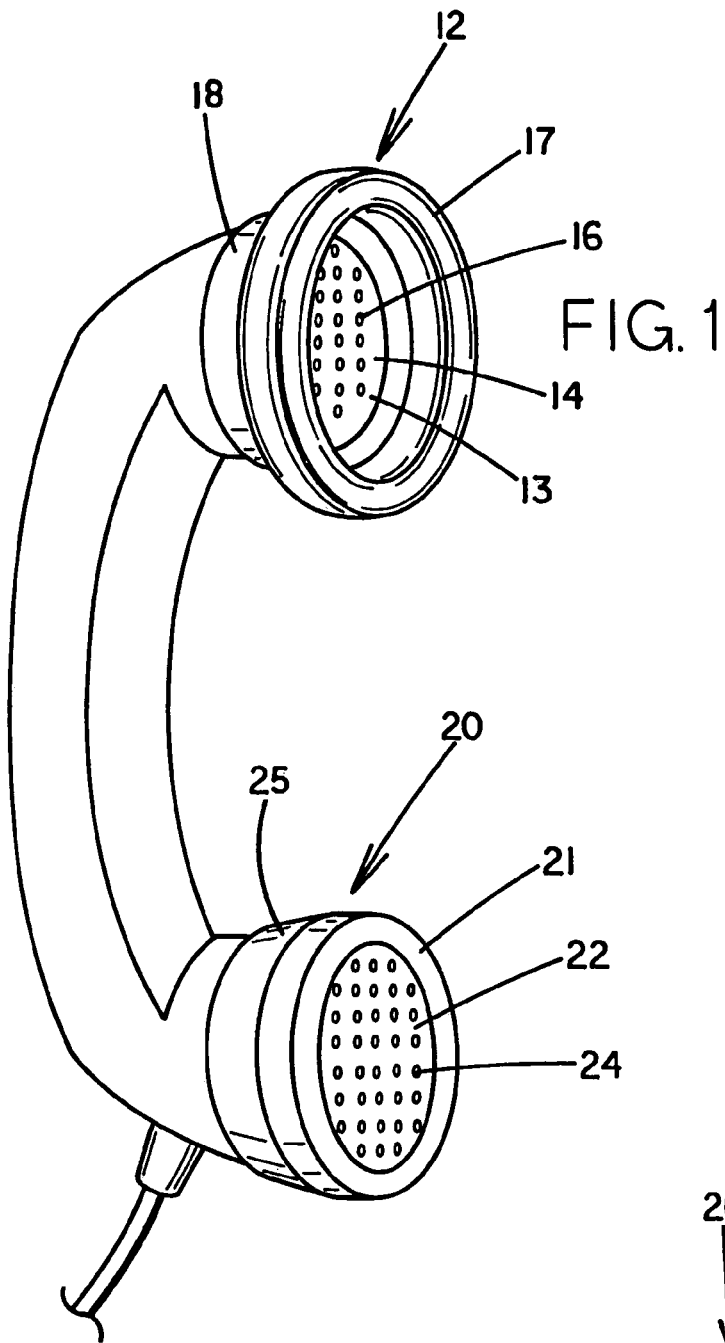
FIG. 1 is a schematic perspective view of a new telephone mouthpiece and earpiece cover system in use mounted on a telephone according to the present invention.

With reference now to the drawings, and in particular to FIGS. 1 through 8 thereof, a new telephone mouthpiece and earpiece cover system embodying the principles and concepts of the present invention and generally designated by the reference numeral 10 will be described.

As best illustrated in FIGS. 1 through 4, the telephone mouthpiece and earpiece cover system 10 generally comprises an earpiece cover attachment 12 and a mouthpiece cover attachment 20. The earpiece cover attachment 12 comprises a base 13 having a plurality of holes 16 extending therethrough. The front surface 14 of the base 13 of the earpiece attachment has an annular lip 17 extending around the outer perimeter of the base 13 of the earpiece cover attachment 12. The back surface 15 of the base 13 of the earpiece cover attachment 12 has a perimeter wall 18 defining a space adapted for inserting the earpiece of a telephone therein. The mouthpiece cover attachment 20 comprises a top 21 with a plurality of apertures 24 extending therethrough. The back surface 23 of the top 21 of the mouthpiece cover attachment 20 has an annular wall 25 which defines a space adapted for inserting a mouthpiece of a telephone therein.

Specifically, the cover attachments 12, 20 are designed for attaching to the mouthpiece and earpiece of a telephone as shown in FIG. 1. The earpiece cover attachment 12 includes a base 13 which is generally flat and has front and back surfaces 14,15. The base 13 of the earpiece cover attachment 12 has a plurality of holes 16 extending through it between the front and back surfaces 14,15. The holes 16 are designed for permitting sound to pass through the base 13 of the earpiece cover attachment 12 when it is attached to the earpiece of a telephone. The front surface 14 of the base 13 has an annular lip 17 extending around the outer perimeter of the base 13. The lip 17 is designed for abutting an ear of a user against it during use. The back surface 15 of the base 13 has a perimeter wall 18 extending around the outer perimeter of the base 13. The perimeter wall 18 defines a space adapted for inserting the earpiece of a telephone therein such that the earpiece cover attachment 12 is attached to the earpiece of the telephone.

The mouthpiece cover attachment 20 includes a top 21 which is preferably generally flat. The top has front and back surfaces 22,23. The top 21 has a plurality of apertures 24 extending between the front and back surfaces 22,23. The apertures 24 are designed for permitting the passage of sounds through the top 21 of the mouthpiece cover attachment 20. The back surface 23 of the top 21 has an annular wall 25 extending around the outer perimeter of the top 21. The annular wall 25 defines a space adapted for inserting a mouthpiece of a telephone therein such that the mouthpiece cover attachment 20 is attached to the mouthpiece of the telephone. As illustrated in FIG. 4, the perimeter wall 18 of the earpiece cover attachment 12 is insertable into the space defined by the annular wall 25 of the mouthpiece cover attachment 20 such that the earpiece cover attachment 12 is attachable to the mouthpiece cover attachment 20 for convenient storage and easy carrying when not in use.

Figure 2:
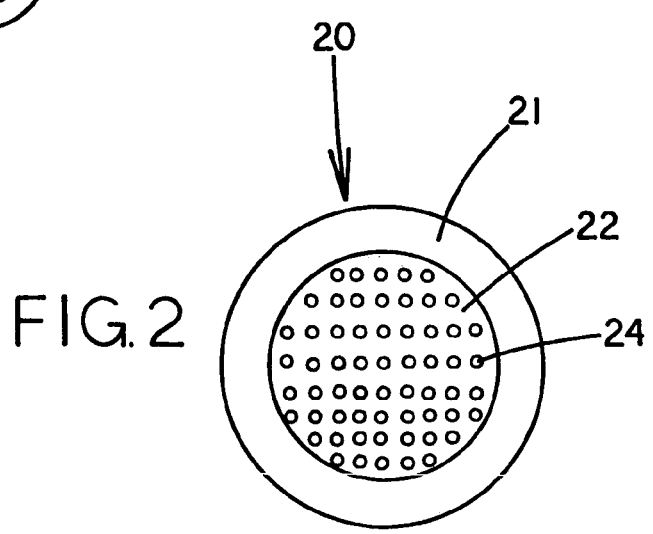
FIG. 2 is a schematic front side view of the circular embodiment of the mouthpiece cover attachment of the present invention.

As illustrated in FIG. 2, ideally, the top 21 of the mouthpiece cover attachment 20 is generally circular such that the annular wall 25 of the mouthpiece cover attachment 20 is generally circular. In this ideal embodiment, the base 13 of the earpiece cover attachment 12 is also generally circular such that the lip 17 and perimeter wall 18 of the earpiece cover attachment 12 are generally circular. Preferably, the diameter of the perimeter wall 18 of the earpiece cover attachment 12 is less than the diameter of the annular wall 25 of the mouthpiece cover attachment 20.

As illustrated in FIG. 3 as an optional ideal embodiment, the base 13 of the earpiece cover attachment 12 is generally oblong such that the lip 17 and perimeter wall 18 of the earpiece cover attachment 12 are generally oblong. In this optional ideal embodiment, the top 21 of the mouthpiece cover attachment 20 is also generally oblong such that the annular wall 25 of the mouthpiece cover attachment 20 is generally oblong.

Ideally, the earpiece cover attachment 12 and the mouthpiece cover attachment 20 comprise an elastomeric material such as rubber or soft plastic so that they may be snugly mounted over the mouthpiece and earpiece of a telephone.

Significantly, the diameter of the perimeter wall of the earpiece cover attachment is preferably less that the diameter of the annular wall of the mouthpiece cover attachment such that the perimeter wall of the earpiece cover attachment is nestable into the annular wall of the mouthpiece cover attachment for facilitating transport of the earpiece cover attachment and the mouthpiece cover attachment as a combined unit (see, e.g., FIG. 4). This preferred size relationship between the mouthpiece and the earpiece permits the nested attachments to form a relatively thin and compact structure that is not substantially thicker than the each of the attachments individually. This compactness of storage size is especially beneficial since the attachments are typically carried in the pocket or purse of the user between uses of public telephones, and thus the thinner the nested attachments are, the more acceptable the attachments are for carrying around in a pocket or purse.

A second and highly preferred embodiment is shown in FIGS. 5-8. In this embodiment, the system comprises an earpiece cover attachment 40, a mouth piece cover attachment 50, and a case 60.

The ear piece cover attachment 40 includes a central wall 41. The central wall 41 comprises front 42 and back 43 surfaces and an outer perimeter 44. A perimeter wall 45 extends around the outer perimeter 44 of the central wall 41. The back surface 43 of the central wall 41 and an inner surface 46 of the perimeter wall 45 define a space 47 adapted for receiving a portion of the earpiece of a telephone therein.

The central wall 41 has a plurality of holes 48 extending through the front 42 and back 43 surfaces of the central wall 41. A ridge 49 is formed in the central wall 41. The ridge 49 protrudes from a plane 70 of the central wall 41 for permitting abutment of the ridge 49 against an ear of the user. The ridge 49 is annular and continuous for forming a substantially closed chamber 71 between the front surface 42 of the central wall 41 and the ear of the user to block external noise from entering the chamber 71. The ridge 49 extends generally along the outer perimeter 44 of the central wall 41. The plurality of holes 48 is located in a central region of the central wall 41 and is surrounded by the ridge 49.

A diameter of the ridge 49 is approximately two-thirds a diameter of the central wall 41. A distance of protrusion of the ridge 49 from a plane of the central wall 41 is substantially equal to a distance of extension of the perimeter wall 45 from the plane of the central wall 41. The central wall 41 is generally circular. The perimeter wall 45 is generally cylindrical.

A mouthpiece cover attachment 50 comprises a primary wall 51. The primary wall 51 includes front 52 and back 53 surfaces and an outer perimeter 54. A peripheral wall 55 extends around the outer perimeter 54 of the primary wall 51. The back surface 53 of the primary wall 51 and an inner surface 56 of the peripheral wall 55 defines a space 57 adapted for receiving a portion of the mouthpiece of a telephone therein.

The primary wall 51 has a plurality of holes 58. The plurality of holes 58 extends through the front 52 and back 53 surfaces of the primary wall 51. A lip 59 is formed in the primary wall 51 for directing voice sounds of the user toward the plurality of holes 58.

The lip 59 protrudes from a plane of the primary wall 51. The lip 59 is generally semicircular. The lip 59 extends along a semicircular portion of the outer perimeter 54 of the primary wall 51. The plurality of holes 58 is generally located in a semicircular region of the primary wall 51 defined by the lip 59. A distance of protrusion of the lip 59 from a plane of the primary wall 51 is less than a distance of extension of the perimeter wall 45 from the plane of the primary wall 51.

A markable surface 72 is formed on the front surface 52 of the primary wall 51. The markable surface 72 is provided for being marked on by a writing instrument. The markable surface 72 extends across the front surface 52. This markable surface is highly useful for recording information such as, for example, calling card information.

A case 60 is provided for protectively holding the attachments 40, 50 during periods of non-use of the earpiece 40 and mouthpiece 50 attachments. The case 60 defines an interior 61. The interior 61 is designed for receiving the attachments 40, 50 for storage.

The case 60 comprises a compartment portion 62 and a lid portion 63. The lid portion 63 is pivotally mounted on the compartment portion 62. The lid portion 63 is designed for pivoting between a closed condition in which the interior 61 of the case 60 is inaccessible and an open condition in which the interior 61 of the case 60 is accessible.

Each of the portions 62, 63 of the case has a central section 64, 65 and a pair of lobe sections 74, 75 and 76, 77. The lobe sections 74, 75 and 76, 77 extend from each of the central sections 64, 65. Each of the pair of lobes 74, 75 and 76, 77 extend in substantially the same direction from the central sections 64, 65. Each of the lobes 74, 75 and 76, 77 of the portions 62, 63 are adapted to receive one of the attachments 40, 50.

A locking mechanism 66 may be provided for selectively locking the portions 62, 63 in the closed condition. The locking mechanism 66 comprises a finger tab 67. The finger tab 67 is mounted on the compartment portion 62. The finger tab 67 is positioned to engage a portion of the lid portion 63 when the portions 62, 63 are in the closed condition. The finger tab 67 releases engagement of the compartment portion 62 with the lid portion 63 when a finger is pressed on the finger tab 67.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A set of covers for attaching to a mouthpiece and earpiece of a telephone handset comprising:
   an earpiece cover fabricated entirely of a pliable material and shaped to resemble contours of the earpiece comprising:
   a first base, including a front surface and rear surface, with a plurality of holes therethrough and further including an outer perimeter;
   said front surface of said first base having an annular lip extending around said outer perimeter of said first base;
   said rear surface of said first base having a perimeter wall extending around said outer perimeter of said first base, said perimeter wall of said rear surface of said first base defining a void adapted for receipt, and retention via friction, of the earpiece of the telephone handset;
   a mouthpiece cover fabricated entirely of a pliable material and shaped to resemble contours of the mouthpiece comprising:
   a second base, including a front surface and rear surface, with a plurality of holes therethrough and further including an outer perimeter;
   said rear surface of said second base having an annular wall extending around said outer perimeter of said second base, said annular wall of said rear surface of said second base defining a void adapted for receipt, and retention via friction, of the mouthpiece of the telephone handset; and
   wherein a diameter of said perimeter wall of said earpiece cover is less than a diameter of said annular wall of said mouthpiece cover such that said perimeter wall of said earpiece cover is nestable within said annular wall of said mouthpiece cover thereby forming a single compact unit.

2. The set of covers of claim 1 wherein said perimeter wall of said earpiece cover is insertable into said void defined by said annular wall of said mouthpiece cover such that said earpiece cover is attachable to said mouthpiece cover.

3. The set of covers of claim 1 wherein said earpiece, mouthpiece or both include a markable surface for a user to record information thereon.

4. The set of covers of claim 1 wherein the earpiece cover and mouthpiece cover are fabricated of an elastic material.

5. A pair of covers for covering a mouthpiece and earpiece of a telephone handset comprising:
   an earpiece cover fabricated entirely of a pliable material and shaped to resemble contours of the earpiece comprising:
   a base, including a front surface and rear surface, having a plurality of holes therethrough,
   a concentric lip extending from said front surface and around an outer perimeter of said base;
   a perimeter wall extending from said rear surface and around said outer perimeter of said base, said perimeter wall defining a space adapted for receipt, and retention via friction, of the earpiece of the telephone handset;
   a mouthpiece cover fabricated entirely of a pliable material and shaped to resemble contours of the mouthpiece comprising:
   a top, including a front surface and rear surface, with a plurality of holes therethrough;
   an annular wall extending from said rear surface and around an outer perimeter of said top, said annular wall of said rear surface of said top defining a space adapted for receipt, and retention via friction, of the mouthpiece of the telephone handset;
   wherein said earpiece, mouthpiece or both include a writable surface providing a means for a user to record information; and
   wherein a diameter of said perimeter wall of said earpiece cover is less than a diameter of said annular wall of said mouthpiece cover such that said perimeter wall of said earpiece cover is nestable within said annular wall of said mouthpiece cover thereby forming a single compact unit.

6. The pair of covers of claim 5 wherein said perimeter wall of said earpiece cover is insertable into said space defined by said annular wall of said mouthpiece cover such that said earpiece cover is attachable to said mouthpiece cover.

7. The pair of covers of claim 5 wherein the earpiece cover and mouthpiece cover are fabricated of a resilient material.

8. A set of covers for attaching to a mouthpiece and earpiece of a telephone handset comprising:
   an earpiece cover fabricated entirely of a pliable material and shaped to resemble contours of the earpiece comprising:
   a first base, including a front surface and rear surface, with a plurality of holes therethrough and further including an outer perimeter;
   said front surface of said first base having an annular lip extending around said outer perimeter of said first base;
   said rear surface of said first base having a perimeter wall extending around said outer perimeter of said first base, said perimeter wall of said rear surface of said first base defining a void adapted for receipt, and retention via friction, of the earpiece of the telephone handset;
   a mouthpiece cover fabricated entirely of a pliable material and shaped to resemble contours of the mouthpiece comprising:
   a second base, including a front surface and rear surface, with a plurality of holes therethrough and further including an outer perimeter;
   said rear surface of said second base having an annular wall extending around said outer perimeter of said second base, said annular wall of said rear surface of said second base defining a void adapted for receipt, and retention via friction, of the mouthpiece of the telephone handset; and
   wherein a diameter of said perimeter wall of said earpiece cover is less than a diameter of said annular wall of said mouthpiece cover such that said perimeter wall of said earpiece cover is nestable within said annular wall of said mouthpiece cover thereby forming a single compact unit.

9. The set of covers of claim 8 wherein said perimeter wall of said earpiece cover is insertable into said void defined by said annular wall of said mouthpiece cover such that said earpiece cover is attachable to said mouthpiece cover.

10. The set of covers of claim 8 wherein said earpiece, mouthpiece or both include a markable surface for a user to record information thereon.

11. A pair of covers for covering a mouthpiece and earpiece of a telephone handset comprising:
- an elastic earpiece cover fabricated entirely of a pliable material and shaped to resemble contours of the earpiece comprising:
- a base, including a front surface and rear surface, having a plurality of holes therethrough,
- a concentric lip extending from said front surface and around an outer perimeter of said base;
- a perimeter wall extending from said rear surface and around said outer perimeter of said base, said perimeter wall defining a space adapted for receipt, and retention via friction, of the earpiece of the telephone handset;
- an elastic mouthpiece cover fabricated entirely of a pliable and shaped to resemble contours of the mouthpiece comprising:
- a top, including a front surface and rear surface, with a plurality of holes therethrough;
- an annular wall extending from said rear surface and around an outer perimeter of said top, said annular wall of said rear surface of said top defining a space adapted for receipt, and retention via friction, of the mouthpiece of the telephone handset;
- wherein a diameter of said perimeter wall of said earpiece cover is less than a diameter of said annular wall of said mouthpiece cover such that said perimeter wall of said earpiece cover is nestable within said annular wall of said mouthpiece cover thereby forming a single compact unit; and
- wherein said earpiece, mouthpiece or both include a writable surface providing a means for a user to record information.

\* \* \* \* \*